US009196096B2

(12) United States Patent
Agarwala

(10) Patent No.: US 9,196,096 B2
(45) Date of Patent: Nov. 24, 2015

(54) 3D-CONSISTENT 2D MANIPULATION OF IMAGES

(71) Applicant: Adobe Systems Incorporated, San Jose, CA (US)

(72) Inventor: Aseem Agarwala, Seattle, WA (US)

(73) Assignee: Adobe Systems Incorporated, San Jose, CA (US)

(*) Notice: Subject to any disclaimer, the term of this patent is extended or adjusted under 35 U.S.C. 154(b) by 248 days.

(21) Appl. No.: 13/792,391

(22) Filed: Mar. 11, 2013

(65) Prior Publication Data

US 2014/0253552 A1 Sep. 11, 2014

(51) Int. Cl.
*G06T 15/20* (2011.01)
*G06T 5/00* (2006.01)
*G06T 19/20* (2011.01)

(52) U.S. Cl.
CPC .............. *G06T 19/20* (2013.01); *G06T 5/006* (2013.01); *G06T 15/20* (2013.01); *G06T 15/205* (2013.01); *G06T 2219/2016* (2013.01)

(58) Field of Classification Search
None
See application file for complete search history.

(56) References Cited

U.S. PATENT DOCUMENTS

2010/0201681 A1* 8/2010 Criminisi et al. ............. 345/419

OTHER PUBLICATIONS

Zorin et al, Correction of Geometric Perceptual Distortions in Pictures, 1995, ACM.*
Lipman et al, Differential Coordinates for Interactive Mesh Editing, 2004, IEEE.*
Fuzzimo, Illustrator Tutorial Make a Glossy 3d PushPin, 2009, http://www.fuzzimo.com/illustrator-tutorial-make-a-glossy-3d-pushpin/.*
Carroll, R. et al., Image Warps for Artistic Perspective Manipulation, SIGGRAPH 2010, 127:1-9, 2010.

* cited by examiner

*Primary Examiner* — Carlos Perromat
*Assistant Examiner* — Xin Sheng
(74) *Attorney, Agent, or Firm* — Kilpatrick Townsend & Stockton LLP

(57) ABSTRACT

One embodiment involves receiving selection of a first quadrilateral and a second quadrilateral in an image being edited in an image editing application. An edge of the first quadrilateral may be shared with an edge of the second quadrilateral. In this embodiment, one or more manipulations associated with the first quadrilateral and/or the second quadrilateral may be received. In response to the received manipulation(s), an updated view of the image is generated or otherwise displayed according to one embodiment. The updated view may be based at least in part on the image, the received manipulation(s), and/or one or more constraints. For example, the updated view may be based at least in part on a three-dimensional scene constraint. In embodiments, the updated view is consistent with a three-dimensional scene in the image. In some embodiments, the updated view is generated in real-time or substantially real-time.

20 Claims, 10 Drawing Sheets

3D-CONSISTENT 2D MANIPULATION OF IMAGES

FIELD OF THE INVENTION

This disclosure relates generally to graphics editing and more particularly relates to maintaining consistency in three-dimensional scenes when manipulating two-dimensional images.

BACKGROUND

Often times, the perspective of a photograph or other image is skewed. For example, because of the perspective from which an image was taken a building may appear tilted, slanted, or otherwise non-vertical in the image. Image editors may be used to manipulate the perspective of an image. However, such image editors may not accurately manipulate the perspective of an image in real-time or substantially real-time. In addition, the manipulation of the perspective of an image by such image editors often results in "tearing" of the image. "Tearing" of an image generally refers to locations within an image where there image data is not properly aligned. Furthermore, often when the perspective of an image is manipulated the result is not consistent with a three dimensional scene. Accordingly, there is a need for efficient systems and methods for 3D-consistent manipulation of 2D images.

SUMMARY

One exemplary embodiment involves a method comprising receiving, by an image editing application, selection of a first quadrilateral in an image being edited in the image editing application. In this exemplary embodiment, the method further comprises receiving, by the image editing application, selection of a second quadrilateral in the image, the second quadrilateral sharing an edge with the first quadrilateral. In this exemplary embodiment, the method further comprises receiving, by the image editing application, a manipulation associated with at least one of the first quadrilateral or the second quadrilateral. In this exemplary embodiment, the method further comprises displaying, by the image editing application, an updated view of the image. In some embodiments, the updated view is based at least in part on the manipulation. In some embodiments, the updated view is based at least in part on a three-dimensional scene constraint. The three-dimensional scene constraint may be based at least in part on a consistency error corresponding to the shard edge and the manipulation In another embodiment, a non-transitory computer-readable medium comprises program code for receiving selection of a first quadrilateral in an image; program code for receiving selection of a second quadrilateral in the image, the second quadrilateral sharing an edge with the first quadrilateral; program code for receiving a manipulation associated with at least one of the first quadrilateral or the second quadrilateral; and program code for generating an updated view of the image, the updated view being based at least in part on a three-dimensional scene constraint. The three-dimensional scene constraint may be based at least in part on a consistency error corresponding to the shared edge of the quadrilaterals and the manipulation.

In yet another embodiment, a system comprises an input device; a display; a memory; and a processor in communication with the input device, the display, and the memory. In this embodiment, the processor is configured for receiving, via the input device, selection of a first quadrilateral in an image, the image being a two-dimensional image, the image comprising a three-dimensional scene in the two-dimensional image; receiving, via the input device, selection of a second quadrilateral in the image, the second quadrilateral sharing an edge with the first quadrilateral; receiving, via the input device, a manipulation associated with at least one of the first quadrilateral or the second quadrilateral; and displaying, on the display, an updated view of the image, the updated view being based at least in part on a three-dimensional scene constraint. The three-dimensional scene constraint can be based at least in part on a consistency error corresponding to the edge and the manipulation.

These illustrative features are mentioned not to limit or define the disclosure, but to provide examples to aid understanding thereof. Additional embodiments are discussed in the Detailed Description, and further description is provided there. Advantages offered by one or more of the embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
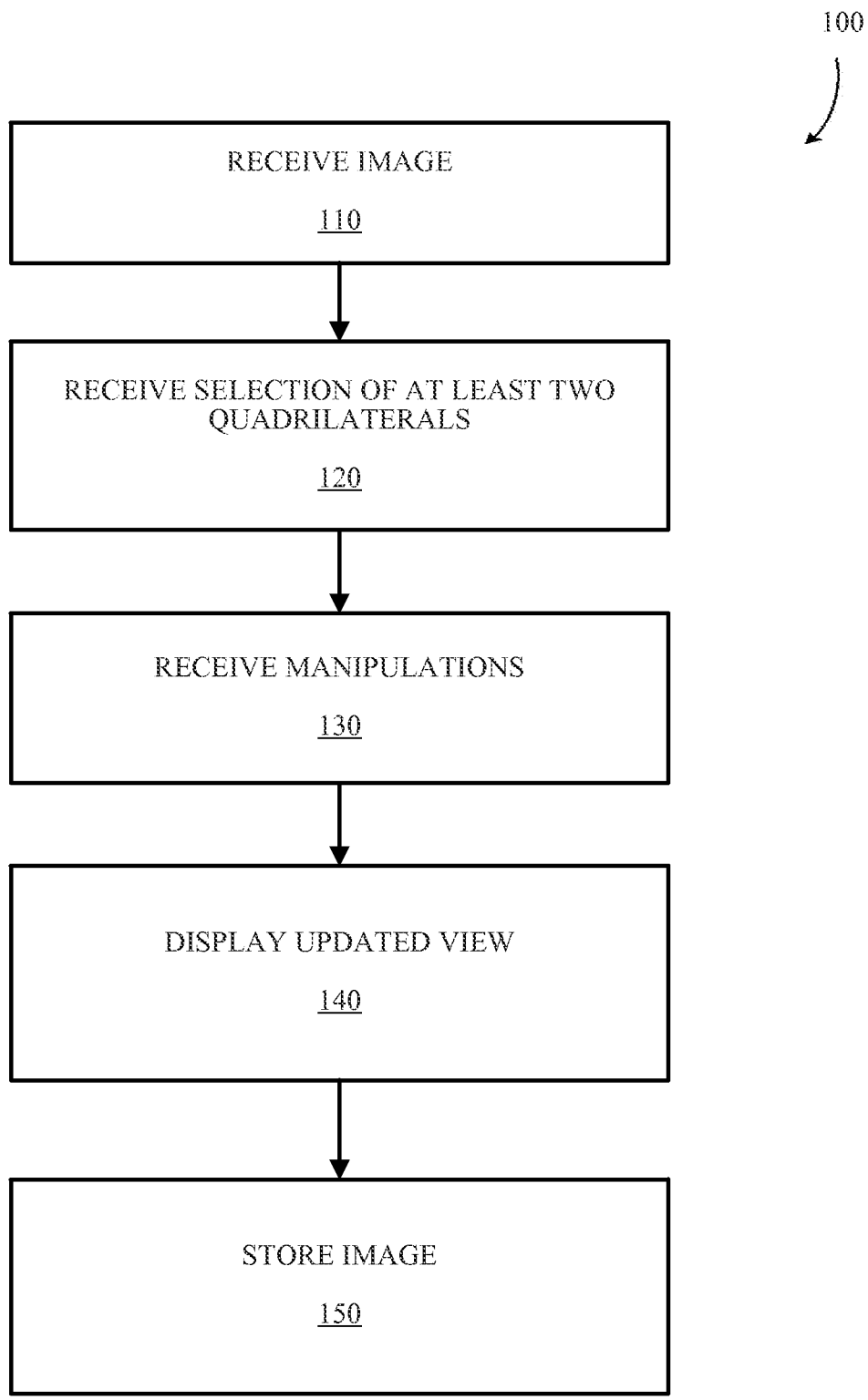
FIG. 1 illustrates a flow chart directed to a method of 3D-consistent manipulation of a 2D image according to an embodiment.

Systems and methods disclosed herein relate generally to the 3D-consistent manipulation of a 2D image according to an embodiment. For example, FIG. 1 illustrates a flow chart directed to a method of 3D-consistent manipulation of a 2D image according to an embodiment. Such a method 100 may be performed by one or more electronic devices, such as a server, tablet computer, desktop computer, and/or another suitable computing device.

The method 100 shown in FIG. 1 begins in block 110 when an image is received. For example, an image editing application being executed on an electronic device may open an image from a disk drive associated with the electronic device. As another example, an electronic device may receive an image from another device through a network interface associated with the electronic device.

Once the image is received 110, selection of at least two quadrilaterals in the image is received 120. For example, in one embodiment, a user uses a mouse associated with the electronic device to draw two quadrilaterals in the image. The two quadrilaterals can share a common edge. As another example, if the electronic device comprises a touch-screen, then a user may be able to select a first quadrilateral and a second quadrilateral by contacting a location on the touch-screen with a finger and dragging the finger along various locations on the touch-screen to create the quadrilaterals.

After receiving the selection of at least two quadrilaterals 120, one or more manipulations to the quadrilaterals is received 130. For example, in one embodiment, a user uses a mouse associated with the electronic device to select a corner of a quadrilateral and drag the corner to a new location within the image. As another example, if the electronic device comprises a touch-screen, then a user may be able to select a corner of a quadrilateral and move the corner to a new location within the image.

After receiving one or more manipulations to the quadrilaterals 130, an updated view of the image is displayed 140. The updated view of the image can be based at least in part on the one or more manipulations. The updated view may be consistent with a three-dimensional scene. For example, if a user moves a corner of a quadrilateral to a new location to manipulate an image, then the updated view may display a portion of the image as being moved, skewed, stretched, or otherwise modified accordingly based on one or more associations between the quadrilateral and the portion of the image. In embodiments, a user can make additional manipulations to the image and/or one or more quadrilaterals and additional updated views of the image are displayed based at least in part on the additional manipulations.

A user's changes to a quadrilateral can be constrained by one or more constraints. An exemplary constraint requires that a right edge of a quadrilateral remain vertical. A user interface may respond to user input attempting to change the quadrilateral based on such a constraint. For example, when a user moves a corner of the quadrilateral, both that corner and another corner of the quadrilateral and/or other quadrilateral(s) may be changed based on the constraint. In the right edge remaining vertical constraint example, if the user moves the corner at the top of the right edge, the corner at the bottom of the right edge might automatically be adjusted to so that the vertical right edge is maintained.

One or more constraints configured to maintain three-dimensional consistency of a two-dimensional image, may be applied. Examples of such three-dimensional scene constraints include but are not limited to: one or more equations such as an equation defining a relationship between at least a first quadrilateral and a second quadrilateral, one or more lines of a quadrilateral being horizontal, one or more lines of a quadrilateral being vertical, a line identified within a scene in the image being straight, and/or one or more vertices corresponding to one or more quadrilaterals and/or an image being locked such that the vertices cannot be moved.

An image can be updated in sync with changes made to the quadrilaterals. Because of the associations between the quadrilateral and the image portions and the use of the constraints, the updated view of the image also adheres to the constraint. Thus, when a quadrilateral outlines a side of a building shown in an image, constraints applied to the quadrilateral and/or the image also constrain how the appearance of the side of the building can be modified. For example, in one embodiment, as a user moves one or more corners of the quadrilaterals, the underlying image is updated in accordance with the user's movements and a three-dimensional scene constraint. In an embodiment, the updated view is generated by measuring a consistency error along each shared edge of the quadrilaterals. In this embodiment, a new location for each of the corners in the received quadrilaterals can be calculated. The underlying image can then be updated based on the new locations of the corners of the quadrilaterals. For example, in an embodiment, another image may be generated based at least in part on a portion of the image corresponding to the quadrilaterals based at least in part on the received manipulation(s) and the three-dimensional scene constraint. This image may be interpolated to the rest of the image to provide an updated view according to various embodiments.

Thus, generally, an updated view may be based at least in part on one or more constraints, one or more received manipulations, and/or one or more current locations of the image corresponding to portions of the received quadrilaterals that are not manipulated. Furthermore, in one embodiment, the updated view is generated and/or otherwise displayed in real-time or substantially real-time. Therefore, in embodiments, one or more manipulations corresponding to a two-dimensional image are received and the updated view maintains consistency with a three-dimensional scene within the image.

After displaying an updated view of the image 140, the updated image is stored 150. For example, an image editing application being executed on an electronic device may store the updated image to a disk drive associated with the electronic device. As another example, an electronic device may store the updated image to another device through a network interface associated with the electronic device. In one embodiment, a user selects an "OK" or "Save" icon within an image editing application being executed on an electronic device to store the image to a disk drive associated with the electronic device. Numerous other embodiments are disclosed herein and variations are within the scope of this disclosure.

These illustrative examples are given to introduce the reader to the general subject matter discussed here and are not intended to limit the scope of the disclosed concepts. The following sections describe various additional embodiments and examples with reference to the drawings in which like numerals indicate like elements. Other embodiments will readily suggest themselves to such skilled persons having the benefit of this disclosure. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related or business-related constraints, or both, and that these specific goals will vary from one implementation to another and from one developer to another.

Illustrative Electronic Device

Figure 2:
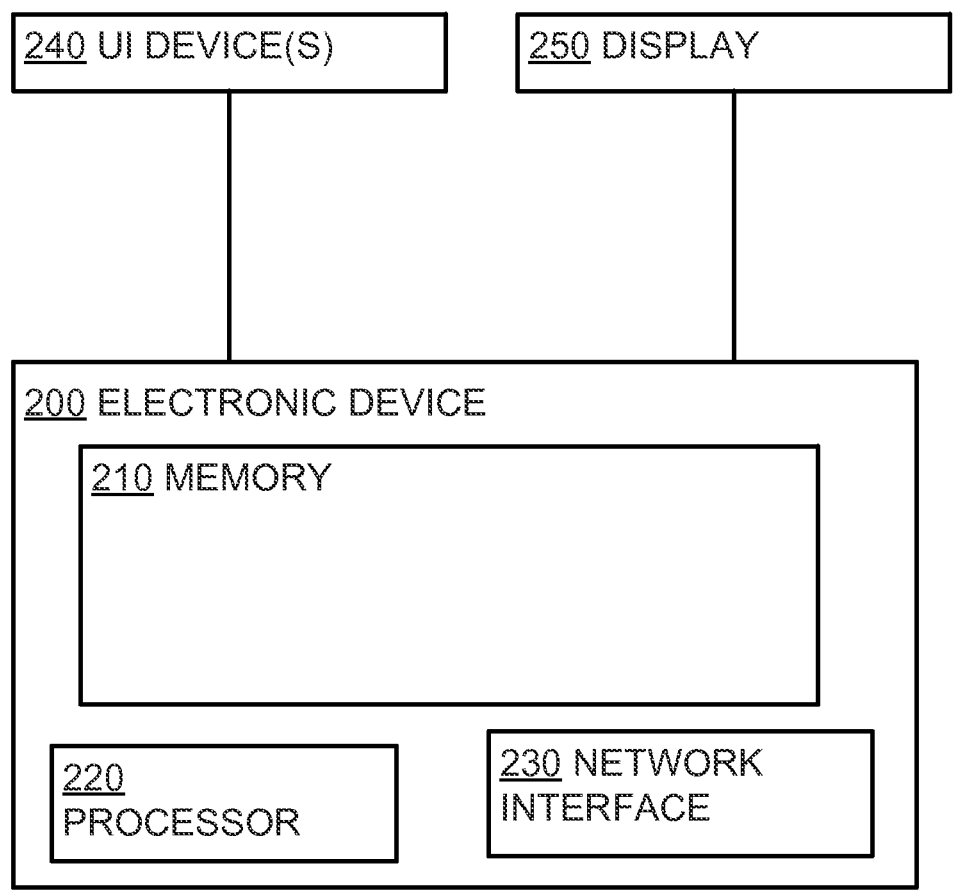
FIG. 2 is a block diagram depicting an exemplary electronic device according to an embodiment.

Referring now to FIG. 2, this figure is a block diagram depicting an exemplary electronic device according to an embodiment. As shown in FIG. 2, the electronic device 200 comprises a computer-readable medium such as a random access memory (RAM) 210 coupled to a processor 220 that executes computer-executable program instructions and/or accesses information stored in memory 210. A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. In one embodiment, the electronic device 200 may comprise a single type of computer-readable medium such as random access memory (RAM). In other embodiments, the electronic device 200 may comprise two or more types of computer-readable medium such as random access memory (RAM) and a disk drive. The electronic device 200 may be in communication with one or more external computer-readable mediums such as an external hard disk drive or an external DVD drive.

The embodiment shown in FIG. 2, comprises a processor 220 which executes computer-executable program instructions and/or accesses information stored in memory 210. The instructions may comprise processor-specific instructions generated by a compiler and/or an interpreter from code written in any suitable computer-programming language including, for example, C, C++, C#, Visual Basic, Java, Python, Perl, JavaScript, and ActionScript®. In an embodiment, the electronic device 200 comprises a single processor 220. In other embodiments, the electronic device 200 comprises two or more processors.

The electronic device 200 as shown in FIG. 2 comprises a network interface 230 for communicating via wired or wireless communication. For example, the network interface 230 may allow for communication over networks via Ethernet, IEEE 802.11 (Wi-Fi), 802.16 (Wi-Max), Bluetooth, infrared, etc. As another example, network interface 230 may allow for communication over networks such as CDMA, GSM, UMTS, or other cellular communication networks. The electronic device 200 may comprise two or more network interfaces 230 for communication over one or more networks.

The electronic device 200 may comprise or be in communication with a number of external or internal devices such as a mouse, a CD-ROM, DVD, a keyboard, a display, audio speakers, one or more microphones, or any other input or output devices. For example, the electronic device 200 shown in FIG. 2 is in communication with various user interface devices 240 and a display 250. In one embodiment, electronic device 200 comprises one or more user interface devices 240 and/or display 250. In other embodiments, electronic device 200 is in communication with one or more user interface devices 240 and/or display 250. In still other embodiments, electronic device 200 comprises one or more user interface devices 240 and/or display 250 and is in communication with one or more user interface devices 240 and/or display 250. Display 250 may use any suitable device including, but not limited to, a LCD monitor, a LED monitor, a CRT monitor, a touch-screen display, a plasma television, another television, and the like.

Electronic device 200 may be a server, a desktop, a personal computing device, a mobile device, or any other type of electronic devices appropriate for providing one or more of the features described herein.

Illustrative System

Figure 3:
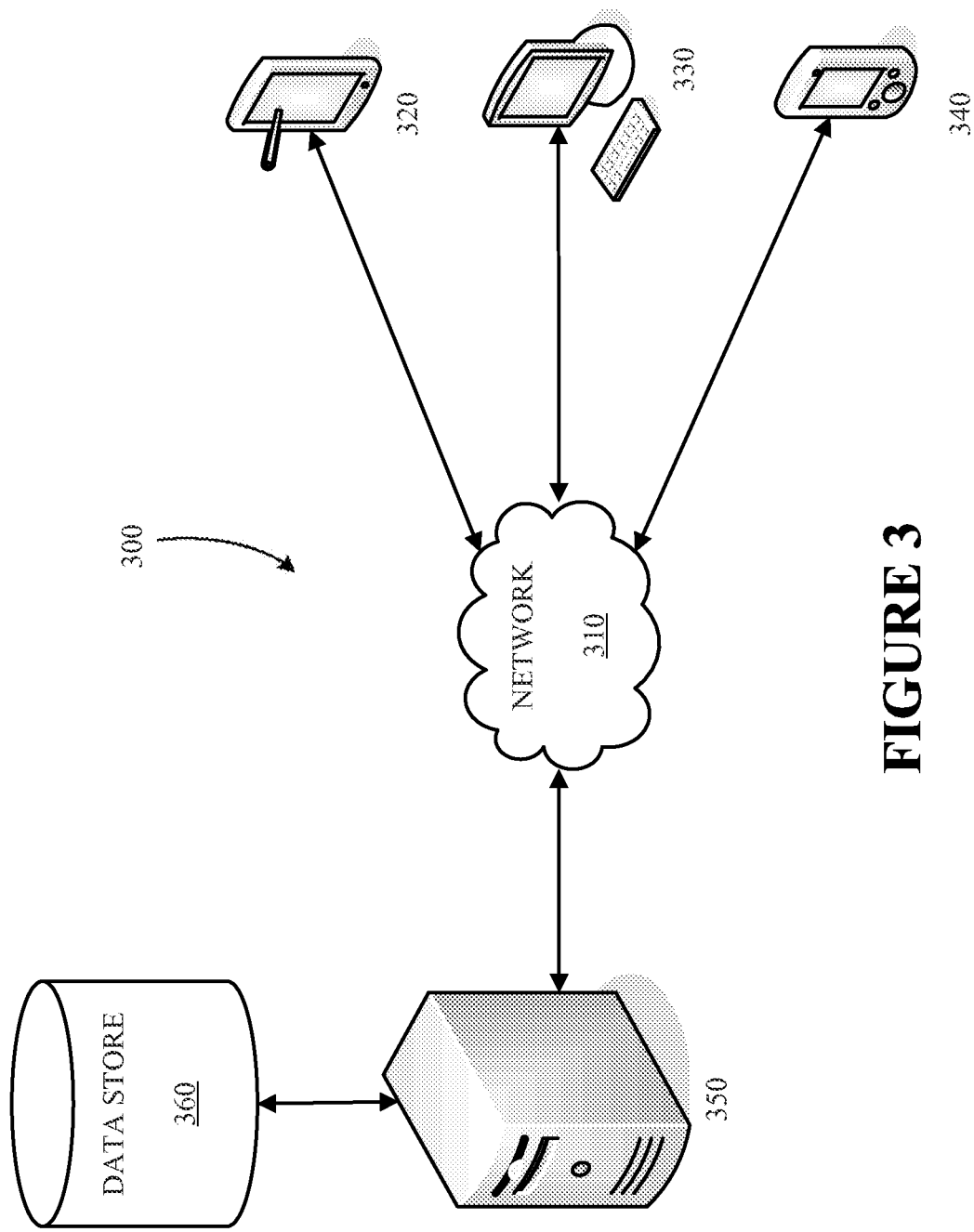
FIG. 3 is a system diagram depicting exemplary computing devices in an exemplary computing environment according to an embodiment.

Referring now to FIG. 3, this figure illustrates a system diagram depicting exemplary computing devices in an exemplary computing environment according to an embodiment. The system 300 shown in FIG. 3 includes three electronic devices, 320-340, and a web server 350. Each of the electronic devices, 320-340, and the web server 350 are connected to a network 310. In this embodiment, each of the electronic devices, 320-340, is in communication with the web server 350 through the network 310. Thus, each of the electronic devices, 320-340, can send requests to the web server 350 and receive responses from the web server 350 through the network 310. Likewise, the web server 350 may send messages to any or all of the electronic devices, 320-340, and may receive messages from any or all of the electronic devices, 320-340, through the network 310.

In an embodiment, the network 310 shown in FIG. 3 facilitates communications between the electronic devices, 320-340, and the web server 350. The network 310 may be any suitable number or type of networks or links, including, but not limited to, a dial-in network, a local area network (LAN), wide area network (WAN), public switched telephone network (PSTN), the Internet, an intranet or any combination of hard-wired and/or wireless communication links. In one embodiment, the network 310 may be a single network. In other embodiments, the network 310 may comprise two or more networks. For example, the electronic devices 320-340 may be connected to a first network and the web server 350 may be connected to a second network and the first and the second network may be connected. Numerous other network configurations are disclosed herein and others are within the scope of this disclosure.

An electronic device may be capable of communicating with a network, such as network 310, and be capable of sending and receiving information to and from another device, such as web server 350. For example, in FIG. 3, one electronic device may be a tablet computer 320. The tablet computer 320 may include a touch-sensitive display and be able to communicate with the network 310 by using a wireless network interface card. Another device that may be a electronic device shown in FIG. 3 is a desktop computer 330. The desktop computer 330 may be in communication with a display and be able to connect to the network 310 through a wired network connection. The desktop computer 330 may be in communication with any number of input devices such as a keyboard of a mouse. In FIG. 3, a mobile phone 340 is provided to illustrate one type of electronic device. The mobile phone 340 may be able to communicate with the network 310 over a wireless communications means such as TDMA, CDMA, GSM, and/or WiFi. Numerous other embodiments are disclosed herein and others are within the scope of this disclosure.

A device receiving a request from another device may be any device capable of communicating with a network, such as network 310, and capable of sending and receiving information to and from another device. For example, in the embodiment shown in FIG. 3, the web server 350 may be a device receiving a request from another device (e.g. electronic devices 320-340) and may be in communication with network 310. A receiving device may be in communication with one or more additional devices, such as additional servers. In one embodiment, a web server may communicate with one or more additional devices to process a request received from an electronic device. For example, web server 350 in FIG. 3 may be in communication with a plurality of additional servers, at least one of which may be used to process at least a portion of a request from any of the electronic devices 320-340 and/or another device. In one embodiment, web server 350 may be part of or in communication with a content distribution network (CDN) that stores data related to one or more web pages, scripts, images, and/or other information.

One or more devices may be in communication with a data store. For example, in FIG. 3, web server 350 is in communication with data store 360. In embodiments, data store 360 is operable to receive instructions from web server 350 and/or other devices in communication with data store 360 and obtain, update, or otherwise process data in response to receiving the instructions. Data store 360 may contain information associated with images, web pages, scripts, image editing applications, image editing plug-ins, and/or other information. Data store 360 shown in FIG. 3 can receive requests from web server 350 and send responses to web server 350. For example, web server 350 may request a particular web page, script, and/or image from data store 360. In response to receiving the request, data store 360 may send the requested information to web server 350. In embodiments, data store 360 can send receive, add, update, or otherwise manipulate information based at least in part on one or more requests received from another device or network, such as web server 350, network 310, or another network or device in communication with data store 360. For example, web server 350 may send a request to data store 360 to store an updated view of an image. In response to receiving the request, data store 360 may store the updated view of the image.

Method of 3D-Consistent Manipulation of a 2D Image According to an Embodiment

Figure 4:
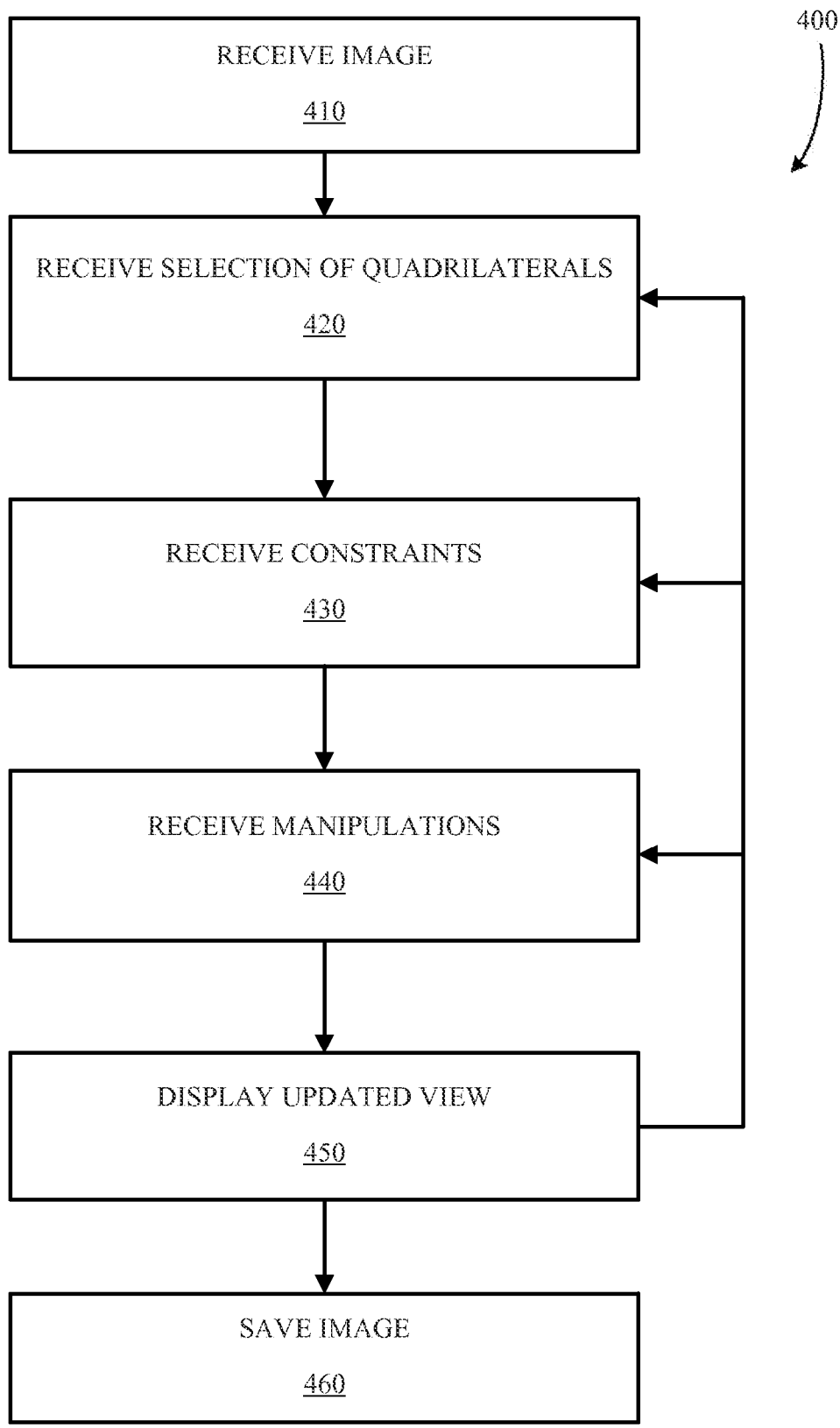
FIG. 4 illustrates a flow chart directed to a method of 3D-consistent manipulation of a 2D image according to an embodiment.

Referring now to FIG. 4, FIG. 4 illustrates a flow chart directed to a method of 3D-consistent manipulation of a 2D image according to an embodiment. The description of the method 400 of FIG. 4 will be made with respect to FIGS. 2 and 3.

The method 400 shown in FIG. 4 begins when an image is received 410. For example, referring to FIG. 2, the processor 220 of the electronic device 200 may receive an image from the memory 210. In another embodiment, the electronic device 200 may receive an image from another device through the network interface 230 or from a hard disk drive or other storage device. For example, referring to FIG. 3, tablet computer 320 may receive an image stored at web server 350 and/or data store 360 through network 310. The web server 350 may send the image to the tablet computer 320 in response to receiving a request from the tablet computer 320. In other embodiments, the web server 350 pushes the image to the tablet computer 320 without receiving a request from the tablet computer 320. The image may be received by an image editing application being executed on the electronic device 200. For example, referring to FIG. 2, the memory 210 may have program code stored thereon for an image editing application. In this embodiment, the processor 220 may receive the program code for the image editing application from the memory 210 and execute at least a portion of the program code for the image editing application. In another embodiment, the processor 220 receives program code for an image editing application from another device through the network interface 230. For example, referring to FIG. 3, tablet computer 320 may receive program code for an image editing application stored at web server 350 and/or data store 360 through network 310. In one embodiment, an electronic device 200 is connected with a camera and receives an image from the camera. In another embodiment, an electronic device 200 has an integrated camera and an image captured by the camera is received by the electronic device. Numerous other embodiments are disclosed herein and variations are within the scope of this disclosure.

Referring back to FIG. 4, after receiving the image 410, the method 400 proceeds to block 420. In block 420, selection of at least one quadrilateral is received. For example, an image editing application being executed on an electronic device may receive selection of a first quadrilateral and selection of a second quadrilateral within an image being edited in the image editing application. The selection of the first and second quadrilaterals may be received by the image editing application via one or more input devices associated with the electronic device. In one embodiment, two or more received quadrilaterals have at least one shared edge.

A quadrilateral may be received in any number of ways. For example, referring to FIG. 3, tablet computer 320 may comprise a touch-screen that can be used to receive input from a user of the tablet computer 320 that indicates the location, size, border, etc. of a quadrilateral. Thus, a user may be able to select a quadrilateral in the image by drawing an outline of the quadrilateral on the touchscreen of the tablet computer 320. In another embodiment, if the electronic device 200 comprises or is in communication with a mouse, then a cursor for the mouse may be pointed to locations corresponding to a quadrilateral within an image. For example, a user of desktop computer 330 may be able use a mouse associated with the computer to select the corners of a quadrilateral. In yet another embodiment, an image editing application being executed on web server 350 receives selection of a quadrilateral from desktop computer 330 through network 310. Numerous other embodiments are disclosed herein and variations are within the scope of this disclosure.

Referring back to FIG. 4, after receiving selection of quadrilaterals in the image 420, the method 400 proceeds to block 430. In block 430, one or more constraints is received. For example, an image editing application being executed on an electronic device may receive one or more constraints for the quadrilateral(s) and/or the image being edited in the image editing application. The one or more constraints may be received by the image editing application via one or more input devices associated with the electronic device. As another example, a constraint may be provided by the image editing application and/or another application in communication with the image editing application. Thus, in one embodiment, a plug-in provides a constraint that should be satisfied in an updated view of the image. As another example, one or more constraints may be provided by desktop computer 330 to web server 350 through network 310.

A constraint may be received in any number of ways. In one embodiment, a constraint is based at least in part on an image being edited in an image editing application and/or one or more of the selected quadrilaterals. For example, in one embodiment, a received constraint specifies that a particular line of a quadrilateral should be vertical. In another embodiment, a received constraint specifies that a particular line of a quadrilateral should be horizontal. As another example, a received constraint may specify that a particular vertex of a received quadrilateral should not be moved as manipulations are received or when an updated view is generated or otherwise displayed. In one embodiment, a received constraint identifies a line in the scene of the image being edited in the image editing application and specifies that the line should remain straight as manipulations are received or when an updated view is generated or otherwise displayed. In yet another embodiment, a received constraint specifies a formula or other equation that should be adhered to as manipulations are received or when an updated view is generated or otherwise displayed. Numerous other embodiments are disclosed herein and variations are within the scope of this disclosure.

Referring back to FIG. 4, after receiving one or more constraints 430, the method 400 proceeds to block 440. In block 464, one or more manipulations are received. For example, an image editing application being executed on an electronic device may receive one or more manipulations associated with one or more of the received quadrilaterals. The one or more manipulations may be received by the image editing application via one or more input devices associated with the electronic device. As another example, a manipulation may be provided by the desktop computer 330 to web server 350 through network 310.

A manipulation may be received in any number of ways. In one embodiment, a manipulation is based at least in part on an image being editing in an image editing application and/or one or more of the selected quadrilaterals. For example, in one embodiment, a manipulation includes selecting one of the corners or one of the quadrilaterals and dragging that corner to a new location within the image. In another embodiment, a pin may be created along a line of a selected quadrilateral, and a manipulation includes selecting the pin and moving the pin to a new location within the image.

In yet another example, a manipulation includes moving a vanishing point associated with the image and/or a selected quadrilateral. For example, in one embodiment, a user can select a mode that displays one or more vanishing points for each selected quadrilateral and/or one or more vanishing points for the image. In this embodiment, a user may manipulate one or more of the vanishing points. For example, in one embodiment, a user may select a particular vanishing point using a mouse corresponding to the desktop computer 330 and drag the vanishing point to a new location. Numerous other embodiments are disclosed herein and variations are within the scope of this disclosure.

Referring back to FIG. 4, after one or more manipulations are received, the method 400 proceeds to block 450. In block 450, an updated view of the image is displayed. For example, if an image editing application is being executed on desktop computer 330, then an updated view may be displayed on the display of the desktop computer. As another example, if an image editing application is being executed on web server 350, then an updated view may be displayed on the display of tablet computer 320 that is in communication with the web server 350 through network 310.

An updated view can be based at least in part on the received image, one or more received quadrilaterals, one or more received constraints, and/or one or more received manipulations. For example, if a received manipulation indicates that a particular corner of a quadrilateral should be moved to a new location, then the updated view of the image may show a portion of the image at the new location. As another example, if a constraint indicates that a particular line of a quadrilateral should be vertical, then the updated view may show a corresponding portion of the image having a vertical line. In one embodiment where a vanishing point associated with a received quadrilateral and/or the image is manipulated, then the updated view is updated based on the manipulation to the vanishing point. In another embodiment, one or more equations or other criteria must be satisfied and the updated view adheres to these constraints. In various embodiments, an updated view is based on the received image, the received quadrilateral(s), the received manipulation(s), and/or any received constraint(s). The updated view may be based at least in part on a three-dimensional scene constraint. In an embodiment, the updated view does not have any tearing along the shared edge of two selected quadrilaterals. In another embodiment, the updated view minimized or otherwise optimized tearing along the shared edge of two selected quadrilaterals. In one embodiment, the updated view is generated or otherwise displayed in real-time or substantially real-time. For example, in an embodiment, the updated view is generated or otherwise displayed without reconstructing a three-dimensional model. Numerous other embodiments are disclosed herein and variations are within the scope of this disclosure.

In embodiments, an updated view is generated and/or otherwise displayed when a user provides a manipulation to one or more of the quadrilaterals. In one embodiment, when a user manipulates a quadrilateral, such as dragging a corner of a quadrilateral to a new location, a consistency error is calculated for one or more shared edges of the quadrilaterals. Thus, in embodiments, a consistency error can be calculated for each shared edge of the quadrilaterals. If the consistency error is non-zero, a function based at least in part on the sum of the consistency error, the distance between a moved quadrilateral vertex and a new location for the vertex, and the distance between one or more unmoved vertexes and their initial positions is utilized. In an embodiment, the function can be solved using a non-linear Gauss Newton optimization for one or more of the vertices in the received quadrilaterals. In one embodiment, only vertices of received quadrilaterals are solved for. For example, if two quadrilaterals having a shared edge are received, then the new locations for the six vertices of the quadrilaterals may be solved for. In embodiments, determining new vertex locations for one or more of the vertices for the received quadrilaterals allows an updated view to be generated in real-time or substantially real time. As one example, and in one embodiment, the vertices of the quadrilaterals may be moved and new positions of the vertices that are consistent with a 3D scene in the image can be determined and used to generate or otherwise display an updated view of the image without reconstructing three-dimensional models corresponding to the image. Numerous other embodiments are disclosed herein and variations are within the scope of this disclosure.

After the new vertices for the quadrilaterals have been calculated, the quadrilaterals' vertices may then be set to their new, calculated locations. In addition, in embodiments, an updated view showing the quadrilaterals in their new locations as well as a modified image corresponding to the new locations of the quadrilaterals' vertices can be displayed. For example, a portion of the image corresponding to the original location of the quadrilaterals' vertices may be updated to reflect the change in locations of the quadrilaterals' vertices. In one embodiment, a warp image is generated based on the original vertices of the quadrilaterals and the new locations of the vertices. In embodiments, the warp image is interpolated to the rest of the image using any suitable technique including, but not limited to, using the Photoshop Puppet Warp tool. Numerous other embodiments are disclosed herein and variations are within the scope of this disclosure.

Referring back to FIG. 4, after displaying an updated view 450, the method 400 proceeds to block 460 or returns to block 420, 430, or 440. For example, in one embodiment, after an updated view has been displayed, a user can select one or more additional quadrilaterals in the image and make modifications to the image based at least in part on the additional quadrilaterals. In this embodiment, another updated view may be shown as the user modifies the additional quadrilaterals or the previously received quadrilaterals. As another example, after an updated view has been displayed, a user can add additional constraints. Thus, in one embodiment, after an updated view has been displayed, the user can select that a particular line in one of the quadrilaterals should be straight. In this embodiment, another updated view may be generated or otherwise displayed that conforms to the added constraint. Therefore, in the new updated view, the particular line is straight.

In yet another example, after the updated view has been displayed, a user may want to make additional manipulations to the updated view using the quadrilaterals that have previously been defined. In this embodiment, the user can move a corner of one or more of the previously defined quadrilaterals. In other embodiment, one or more additional quadrilaterals, constraints, and/or manipulations may be received after the updated view has been displayed. In this embodiments, a new updated view is displayed based at least in part on the one or more additional quadrilaterals, constraints, and/or manipulations.

After displaying the updated view(s), the user can save the updated view of the image as shown in block 460. In one embodiment, the saved image includes at least a portion of the updated view. For example, the saved image may include changes made to the image in response to receiving quadrilaterals, constraints, and/or manipulations. The image can be saved in any number of ways. In one embodiment, referring to FIG. 2, the processor 220 of the electronic device 200, stores the image in the memory 210. In another embodiment, the processor 220 of the electronic device 200, stores the image in one or more storage mediums such as a hard disk drive, flash drive, or another suitable storage device. In another embodiment, the electronic device 200 stores the image to another device through the network interface 230. For example, referring to FIG. 3, tablet computer 320 may store an image at web server 350 and/or data store 360 through network 310. The tablet computer 320 may send the image to the web server 350 in response to receiving a request from the web server and/or another computing device in communication with the tablet computer 320. In other embodiments, the tablet computer 320 pushes the image to the web server 350 and/or data store 360 without receiving a request from another device.

The image may be stored by using an image editing application being executed on the electronic device 200. For example, referring to FIG. 2, the memory 210 may have program code stored thereon for an image editing application. In this embodiment, the processor 220 may receive the program code for the image editing application from memory 210 and execute at least a portion of the program code for the image editing application. In another embodiment, the processor 220 receive program code for an image editing application from another device through the network interface 230. For example, referring to FIG. 3, tablet computer 320 may receive program code for an image editing application stored at web server 350 and/or data store 360 through network 310. In this embodiment, the image editing application may contain instructions that cause the image to be stored in one or more storage devices. Numerous other embodiments are disclosed herein and variations are within the scope of this disclosure.

Example 3D-Consistent Manipulation of a 2D Image According to an Embodiment

Figure 5A:
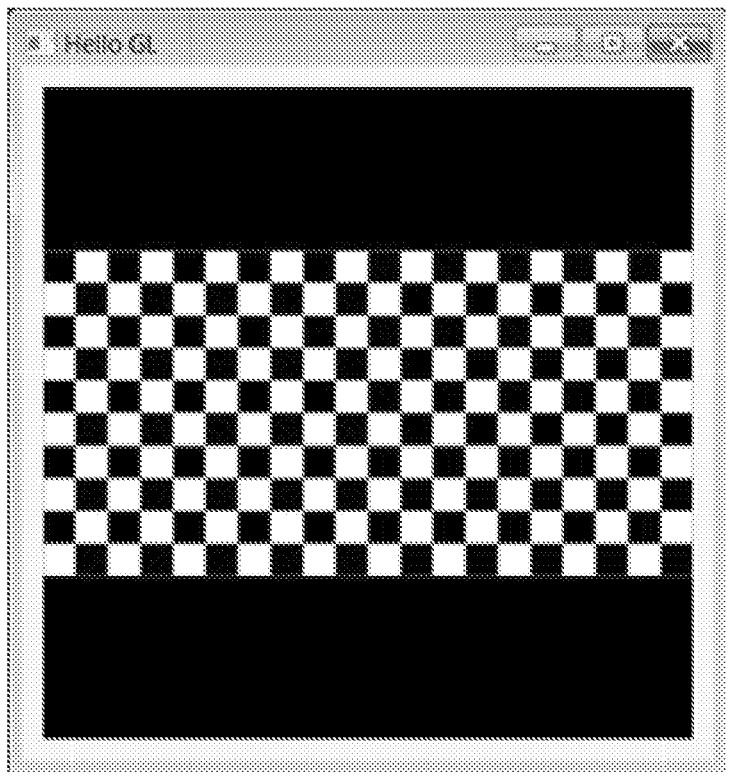
FIG. 5A illustrates aspects of 3D-consistent manipulation of a 2D image according to an embodiment.
Figure 5B:
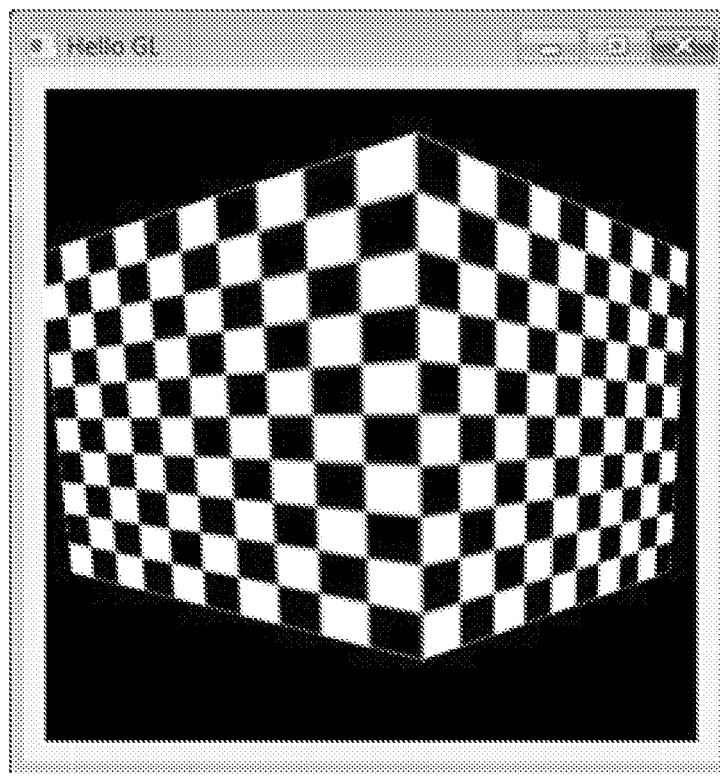
FIG. 5B illustrates aspects of 3D-consistent manipulation of a 2D image according to an embodiment.

Referring now to FIG. 5, FIGS. 5A-B illustrate aspects of 3D-consistent manipulation of a 2D image according to an embodiment. FIG. 5C illustrates an updated view that is not consistent with a 3D scene. In addition, FIG. 5D illustrates aspects of two quadrilaterals having a shared edge.

In FIG. 5A, a two-dimensional checkerboard pattern is shown. In embodiments, a user can place one or more quadrilaterals on top of the image shown in FIG. 5A. For example, a user may select a first quadrilateral in the image and a second quadrilateral in the image. The first and second quadrilaterals may have a shared edge. For example, a user may draw, layout or otherwise select two quadrilaterals having a shared edge on top of the image shown in FIG. 5A to outline two sides of a building. In this embodiment, the user can then move the corners (or other aspects) of the quadrilaterals to manipulate the image. As the user moves the corners (or other aspects) of the quadrilaterals, one or more updated views are generated and/or displayed. The positions of the quadrilateral vertices can maintain consistency with a 3D scene shown in the image. In some embodiments, the updated view(s) are generated and/or displayed without reconstructing a 3D geometry within the image. The updated view(s) can be consistent with a hypothetical 3D scene.

FIG. 5B illustrates an updated view of the checkerboard shown in FIG. 5A where two quadrilaterals having a shared edge have been placed on top of the image and at least one corner of the quadrilaterals have been manipulated. As shown in FIG. 5B, the corners, or vertices, have been moved to locations that are consistent with a 3D scene. In particular, the two middle vertices have been pulled away from the horizontal mid-line. This provides an appearance that a user is looking at the edge of a 3D cube. Other vertices of the quadrilaterals may be adjusted such that the two quadrilaterals are consistent with a 3D scene in the image. For example, as shown in FIG. 5B, there is no tearing along the shared edge of the quadrilaterals. In addition, the checkerboard pattern along the shared edge of the quadrilaterals is properly aligned (e.g., match up) with one another. In one embodiment, and as discussed in detail herein, the vertices of the quadrilaterals may be adjusted by an optimization technique configured to provide a 3D consistent scene.

Figure 5C:
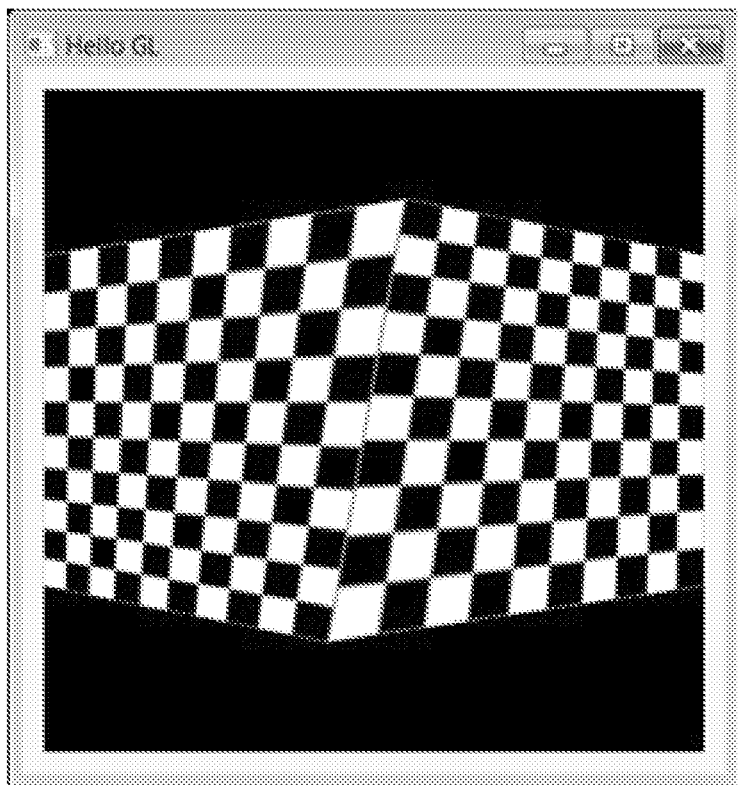
FIG. 5C illustrates an updated view that is not consistent with a 3D scene according to an embodiment.

In contrast, FIG. 5C illustrates an updated view that is not consistent with a 3D scene. As shown in FIG. 5C, the vertices of the quadrilaterals have not been moved to locations consistent with a 3D scene. As a result, and as shown in FIG. 5C, in some embodiments, there is tearing along the shared edge of the quadrilaterals if the updated view is not consistent with a 3D scene. In addition, the checkerboard patterns along the shared edge of the quadrilaterals are not properly aligned (e.g., do not match up) thereby resulting in tearing within the image. In addition, the checkerboard pattern has different deformations along the shared edge of the quadrilaterals.

Figure 5D:
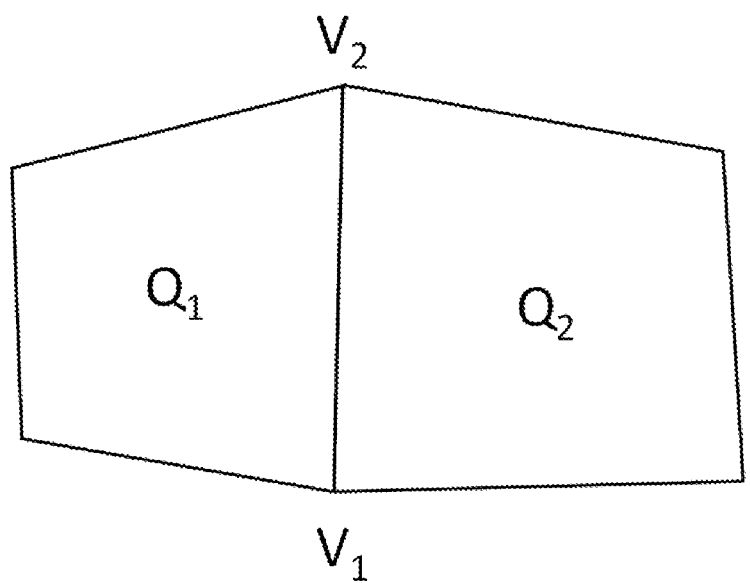
FIG. 5D illustrates aspects of two quadrilaterals having a shared edge according to an embodiment.

In some embodiments, a quadrilateral is transformed or otherwise manipulated into another quadrilateral. For example, a corner of one quadrilateral may be moved to a new position and used to generate another quadrilateral having a corner at the new position. In one embodiment, and as shown in FIG. 5D, two quadrilaterals (i.e. $Q_1$ and $Q_2$) having a shared edge between vertices $V_1$ and $V_2$ of the quadrilaterals may be selected in an image. A perspective transform, or homography, may be defined for each quadrilateral. A homography is an invertible transformation that maps straight lines to straight lines. In embodiments, a homography can model a two-dimensional appearance of a three-dimensional plane in space. For example, a first homograph $H_1$ may be defined to transform quadrilateral $Q_1$ and a second homograph $H_2$ may be defined to transform quadrilateral $Q_2$ shown in FIG. 5D. Each homograph can be represented by a 3×3 matrix that operates in homogeneous coordinates. For example, each two-dimensional vertex having an x and y coordinates (x, y) can be represented in 3D homogeneous x, y, and w coordinates (x, y, w). In this embodiment, the original 2D vertices of a quadrilateral can be calculated or otherwise recovered as (x/w, y/w).

In some embodiments, along an edge of a quadrilateral, the transformation induced by its homography can be linearly interpolated in homogeneous coordinates from the two corner vertices defining the edge. In such an embodiment, the two quadrilaterals already share the same x coordinate and y coordinate along the shared edge. However, in this embodiment, the w coordinates may or may not be consistent between the two quadrilaterals having the shared edge. In some embodiments, in order to be consistent, the ratio of the w values must be the same because these values define the amount of scaling that occurs as translations occur from $V_1$ to $V_2$. In one embodiment, the following consistency constraint must be true:

$$\frac{[H_1 V_1] \cdot w}{[H_1 V_2] \cdot w} = \frac{[H_2 V_1] \cdot w}{[H_2 V_2] \cdot w}$$

In some embodiments, as a user pulls, moves, or otherwise changes a vertex to manipulate the image, the overall positions of the quadrilateral vertices are moved in a way that preserves a constraint, such as one or more of the constraints described herein. In such an embodiment, changes to the overall positions of the quadrilateral vertices may also respect the user's changes to the vertex. In some embodiments, the vertices not being changed by a user are moved as little as possible. In embodiments, it may be difficult to satisfy each of these goals (e.g., constraints, user's changes to one or more vertices, minimal changes to other vertices, etc.) simultaneously. Therefore, in some embodiments, an optimization is calculated that attempts to balance these goals. For example, in one embodiment, an optimization is performed that attempts to 1) respect at least one constraint, such as the constraint defined above; 2) place the user-changed vertex wherever the user is moving the vertex to; and 3) change the vertices of the quadrilaterals not being user-changed as little as possible.

In one embodiment, the vertex that a user will change can be defined as $V_m$. In embodiments, $V_m$ may be $V_1$ or $V_2$ shown in FIG. 5D or another vertex. The location of the user-changed vertex (e.g., the location that the user has dragged a selected vertex to), may be defined as M and the number of vertices may be defined as n. For example, in the embodiment shown in FIG. 5D, n is 6. In one embodiment, the consistency constraint described above can be transformed into a term such as, C(V), and the magnitude of error of this term can be calculated using the following equation:

$$C(V) = ([H_1 V_1] \cdot w [H_2 V_2] \cdot w - [H_2 V_1] \cdot w [H_1 V_2] \cdot w)^2$$

In some embodiments, a new set of vertices, V, can be computed given the current vertex locations V', the vertex that the user will change $V_m$, and a current location of the user M (e.g., a current location of a cursor location). For example, in one embodiment, a new set of vertices V can be calculated using the following equation:

$$\mathrm{argmin}_V \left\{ \alpha_1 C(V) + \alpha_2 (V_m - M)^2 + \alpha_3 \sum_{i=0}^{n} (V_i - V_i')^2 \right\}$$

In embodiments, this equation can be solved using a Gauss-Newton algorithm. The weights, $\alpha_1$, $\alpha_2$, and $\alpha_3$, represent tradeoffs between the three terms. For example, $\alpha_1$ represents a weighting for the consistency constraint, $\alpha_2$ represents a weighting for the user's location (e.g., a current location of a cursor location), and $\alpha_3$ represents a weighting for the sum of the squared differences between the current vertices and the new vertices). In various embodiments, the weights, $\alpha_1$, $\alpha_2$, and $\alpha_3$ can be any number of suitable values. For example, in one embodiment, where the consistency constraint and the constraint of the location of the user-changed vertex needs to be strongly satisfied, then the $\alpha_1$ and $\alpha_2$ weights are set much higher than the third weight. Numerous other embodiments are disclosed herein and variations are within the scope of this disclosure.

Example 3D-Consistent Manipulation of a 2D Image According to an Embodiment

Figure 6A:
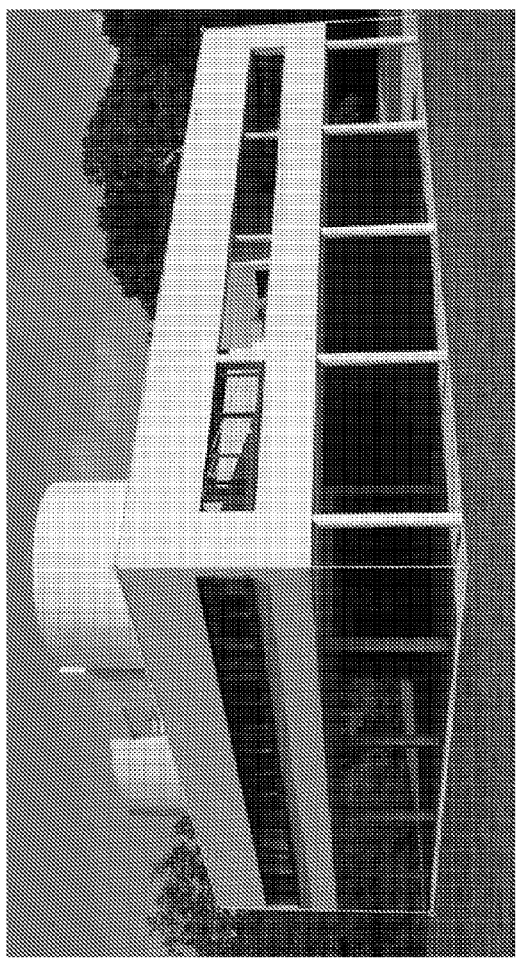
FIG. 6A illustrates aspects of 3D-consistent manipulation of a 2D image according to an embodiment.
Figure 6B:
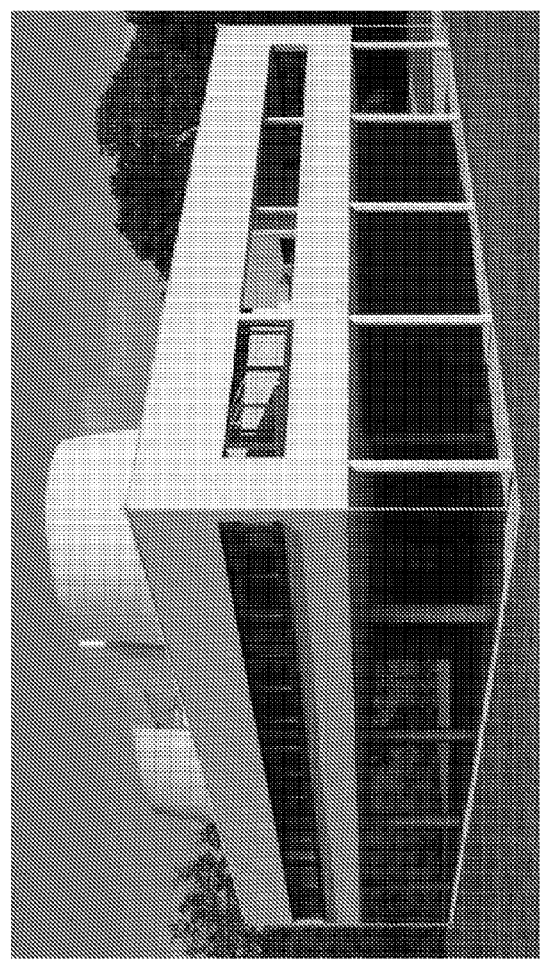
FIG. 6B illustrates aspects of 3D-consistent manipulation of a 2D image according to an embodiment.

FIGS. 6A-B illustrate aspects of 3D-consistent manipulation of a 2D image according to an embodiment. As shown in FIG. 6A, a selection of a first quadrilateral enclosing the left side of the building has been received. In addition, a selection of a second quadrilateral enclosing the right side of the building has been received. As shown in FIG. 6A, the first quadrilateral and the second quadrilateral share a common edge.

FIG. 6B illustrates an updated view of the image shown in FIG. 6A. The updated view may be generated or otherwise displayed in response to receiving the selection of the first and second quadrilaterals and/or in response to receiving a modification to the quadrilateral(s). For example, the updated view can be generated or otherwise displayed in response to a user selecting one of the corners of the first quadrilateral or the second quadrilateral and moving it to a new location. As shown in FIG. 6B, and according to various embodiments, the updated view is consistent with a three-dimensional scene shown in the image. For example, in the updated view the building verticals have been straightened. In addition, the viewpoint has been moved to the right in the updated view, thereby making the left and ride sides of the building appear similar in width. In addition, the height of the building has been made slightly taller in the updated view. As shown in FIG. 6B, each of the vertical lines of the first and the second quadrilaterals have been straightened. Thus, FIG. 6B illustrates an updated view that is consistent with a three-dimensional scene shown in the image according to one embodiment. Numerous other embodiments are disclosed herein and variations are within the scope of this disclosure.

Example 3D-Consistent Manipulation of a 2D Image According to an Embodiment

Figure 7A:
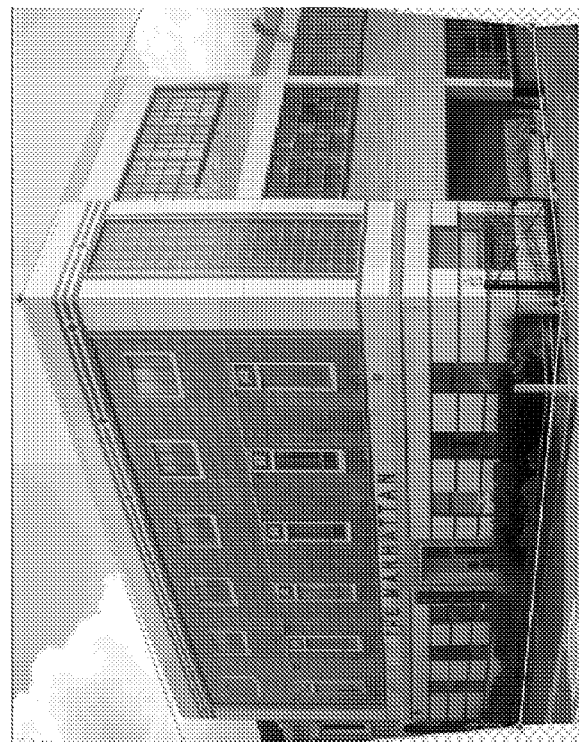
FIG. 7A illustrates aspects of 3D-consistent manipulation of a 2D image according to an embodiment.
Figure 7B:
FIG. 7B illustrates aspects of 3D-consistent manipulation of a 2D image according to an embodiment.
Figure 7C:
FIG. 7C illustrates aspects of 3D-consistent manipulation of a 2D image according to an embodiment.

FIGS. 7A-C illustrate aspects of 3D-consistent manipulation of a 2D image according to an embodiment. One or more of the original images, before any manipulations, shown in FIGS. 7A-C may be copyrighted by AgnosticPreachersKid (Own work) [CC-BY-SA-3.0 (http://creativecommons.org/licenses/by-sa/3.0) or GFDL (http://www.gnu.org/copyleft/fdl.html)], via Wikimedia Commons. FIG. 7A illustrates an image received by an image editing application. As shown in FIG. 7A, the building appears to be leaning.

FIG. 7B illustrates an updated view of the image shown in FIG. 7A. In FIG. 7B, two quadrilaterals have been selected and manipulated in the image editing application. In this embodiment, the first quadrilateral defines the left side of the building, the second quadrilateral defines the right side of the building, and the first and the second quadrilateral have a shared edge. The updated view in FIG. 7B shows that the vertical lines of the quadrilaterals and the image locations corresponding to the quadrilaterals have been straightened. Thus, in FIG. 7B, the building does not appear to be leaning as much as in FIG. 7A.

FIG. 7C illustrates another updated view of the image shown in FIG. 7B. As discussed herein, the updated view may be generated or otherwise updated in response to one or more manipulations of the image and/or the quadrilaterals. In FIG. 7C, in addition to straightening the vertical lines of the quadrilaterals and the building, the image has been further updated to make the building appear less wide-angle. Thus, as shown in FIG. 7C, the vanishing points of the quadrilaterals have been moved further out and the height of the building appears more correctly apportioned to the sides of the building. Therefore, FIGS. 7B and 7C each provide an example of three-dimensional consistency of a scene within an image being editing in an image editing application as modifications are made to one or more quadrilaterals associated with the image. Numerous other embodiments are disclosed herein and variations are within the scope of this disclosure.

Example 3D-Consistent Manipulation of a 2D Image According to an Embodiment

Figure 8A:
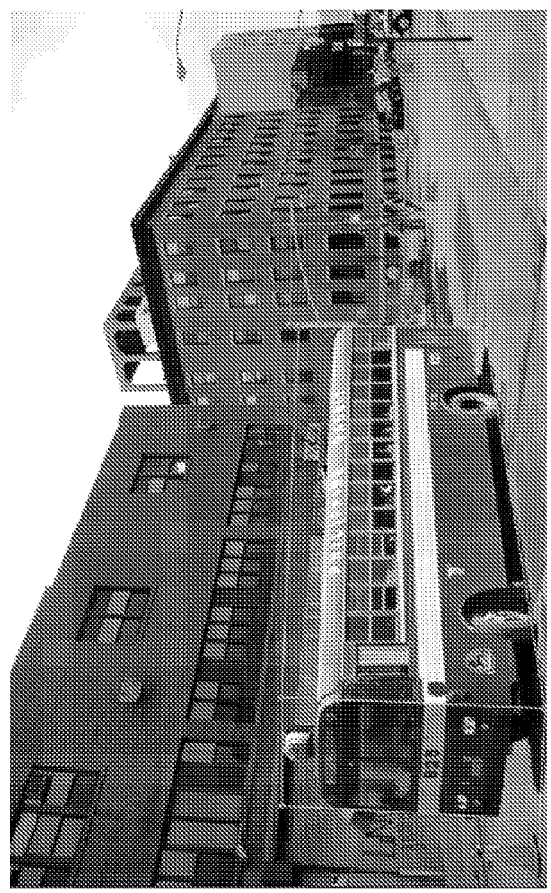
FIG. 8A illustrates aspects of 3D-consistent manipulation of a 2D image according to an embodiment.
Figure 8B:
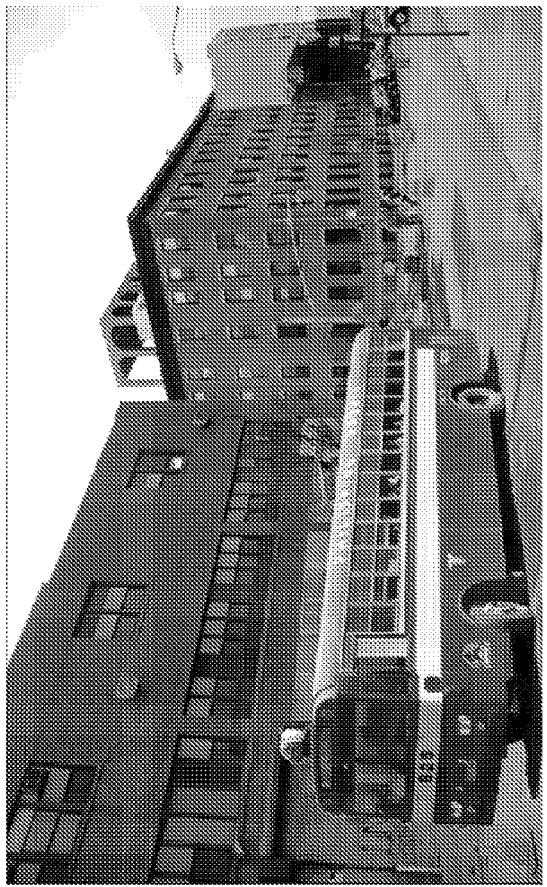
FIG. 8B illustrates aspects of 3D-consistent manipulation of a 2D image according to an embodiment.

FIGS. 8A-B illustrate aspects of 3D-consistent manipulation of a 2D image according to an embodiment. One or more of the original images, before any manipulations, shown in FIGS. 8A-B may be copyrighted by express000 (Own work) [CC-BY-SA-2.0(http://creativecommons.org/licenses/by-nc-sa/2.0/deed.en), via http://www.flickr.com/photos/25653307@N03/3201563676/].

FIG. 8A illustrates an image received by an image editing application. As shown in FIG. 8A, the bus is composited onto a street scene. However, the bus in FIG. 8A does not appear consistent with a three-dimensional scene in the image because the vanishing points of the bus do not match the street and buildings. As shown in the updated view of FIG. 8B, two quadrilaterals have been received and are used to more closely match the bus to the street scene. In FIG. 8B, the first quadrilateral defines the front width of the bus and the second quadrilateral defines the side length of the bus. In this embodiment, one or more corners of the quadrilaterals can be moved to provide a three-dimensional consistent scene in the two-dimensional image. For example, in updated view shown in FIG. 8B, the vanishing points of the bus more closely match the street scene than in FIG. 8A. Thus, FIG. 8B provides an example of a three-dimensional consistent scene in a two-dimensional image in accordance with an embodiment. Numerous other embodiments are disclosed herein and variations are within the scope of this disclosure.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:
1. A method comprising:
receiving, by an image editing application, selection of a first quadrilateral in an image being edited in the image editing application;
receiving, by the image editing application, selection of a second quadrilateral in the image, the second quadrilateral sharing an edge with the first quadrilateral;
receiving, by the image editing application, a manipulation associated with at least one of the first quadrilateral or the second quadrilateral;

calculating, by the image editing application, a consistency error associated with the manipulation, the consistency error being based on the shared edge of the quadrilaterals; and displaying, by the image editing application, an updated view of the image based at least in part on a three-dimensional scene constraint, the three-dimensional scene constraint being based at least in part on the consistency error and the manipulation.

2. The method of claim 1, wherein the updated view of the image is generated in real-time or substantially real-time.

3. The method of claim 1,
wherein receiving the manipulation comprises:
receiving selection of a corner of the first quadrilateral or the second quadrilateral; and
receiving input indicating that the corner should be moved to a new location; and
wherein displaying the updated view comprises displaying an updated portion of the image corresponding to the corner at the new location.

4. The method of claim 1,
wherein receiving the manipulation comprises:
receiving selection of a vanishing point corresponding to the first quadrilateral or the second quadrilateral; and
receiving input indicating that that the vanishing point should be moved to a new location; and
wherein displaying the updated view comprises displaying the image such that vanishing point corresponds with the new location.

5. The method of claim 1,
wherein receiving the manipulation comprises:
receiving selection of a pin on a line of the first quadrilateral or the second quadrilateral, a location on the pin not being a corner; and
receiving input indicating that the pin should be moved to a new location; and
wherein displaying the updated view comprises displaying the image to correspond with the pin having the new location.

6. The method of claim 1, wherein the three-dimensional scene constraint further comprises specifying that a line of the first quadrilateral or the second quadrilateral should be horizontal.

7. The method of claim 1, wherein the three-dimensional scene constraint further comprises specifying that a line of the first quadrilateral or the second quadrilateral should be vertical.

8. The method of claim 1, wherein the three-dimensional scene constraint further comprises specifying that a vertex of the first quadrilateral or the second quadrilateral should not be moved in the updated view.

9. The method of claim 1, wherein the three-dimensional scene constraint further comprises an equation associated with the first quadrilateral and the second quadrilateral.

10. The method of claim 1, further comprising:
identifying a line in a three-dimensional scene in the image, wherein the three-dimensional scene constraint further comprises specifying that the line should be straight.

11. The method of claim 1, wherein there is no tearing along the shared edge between the first quadrilateral and the second quadrilateral in the updated view.

12. The method of claim 1, further comprising:
after displaying the updated view of the image:
receiving an additional input, the additional input comprising at least one of an additional constraint, an additional manipulation, or selection of another quadrilateral; and
displaying another view of the image, the another view being based at least in part on the received additional input, the another view being consistent with the three-dimensional scene in the image.

13. The method of claim 1, further comprising storing the updated view.

14. The method of claim 1, wherein the updated view comprises a straightened line for at least one of the first quadrilateral or the second quadrilateral.

15. The method of claim 1, wherein the updated view comprises moving at least one vanishing point associated with the first quadrilateral or the second quadrilateral.

16. The method of claim 1, wherein the updated view is displayed without reconstructing a three-dimensional model associated with the image.

17. The method of claim 1, wherein the manipulation comprises selection and movement of a vertex corresponding to at least one of the first quadrilateral or the second quadrilateral to a new location in the image; and
wherein the method further comprises:
calculating at least one new vertex for at least one of the first quadrilateral or the second quadrilateral, wherein the calculated at least one new vertex is based at least in part on the movement of the vertex to the new location and the three-dimensional scene constraint; and
wherein the updated view is based at least in part on the calculated at least one new vertex.

18. The method of claim 1,
wherein the manipulation comprises:
selecting a vertex corresponding to at least one of the first quadrilateral or the second quadrilateral; and
moving the vertex to a new location in the image; and
wherein the updated view minimizes changes in locations of vertices, other than the selected vertex, corresponding to the first quadrilateral and the second quadrilateral.

19. A non-transitory computer-readable medium comprising:
program code for receiving selection of a first quadrilateral in an image;
program code for receiving selection of a second quadrilateral in the image, the second quadrilateral sharing an edge with the first quadrilateral;
program code for receiving a manipulation associated with at least one of the first quadrilateral or the second quadrilateral;
program code for calculating a consistency error associated with the manipulation, the consistency error being based on the shared edge of the quadrilaterals; and
program code for generating an updated view of the image based at least in part on a three-dimensional scene constraint, the three-dimensional scene constraint being based at least in part on the consistency error and the manipulation.

20. A system comprising:
an input device;
a display;
a memory; and
a processor in communication with the input device, the display, and the memory, the processor configured for:

receiving, via the input device, selection of a first quadrilateral in an image, the image being a two-dimensional image, the image comprising a three-dimensional scene in the two-dimensional image;

receiving, via the input device, selection of a second quadrilateral in the image, the second quadrilateral sharing an edge with the first quadrilateral;

receiving, via the input device, a manipulation associated with at least one of the first quadrilateral or the second quadrilateral;

calculating a consistency error associated with the manipulation, the consistency error being based on the shared edge of the quadrilaterals; and displaying, on the display, an updated view of the image, the updated view being based at least in part on a three-dimensional scene constraint, the three-dimensional scene constraint being based at least in part on the consistency error and the manipulation.

* * * * *